(12) United States Patent
Kang et al.

(10) Patent No.: US 10,648,860 B2
(45) Date of Patent: May 12, 2020

(54) SPECTROSCOPIC DEVICE

(71) Applicant: Electronics and Telecommunications Research Institute, Daejeon (KR)

(72) Inventors: Hyun Seo Kang, Gwangju (KR); Kyeeun Kim, Gwangju (KR); Keo-Sik Kim, Gwangju (KR); Sung Chang Kim, Gwangju (KR); Ji Hyoung Ryu, Jeonju-si (KR); Gi Hyeon Min, Gwangju (KR); Si Woong Park, Gwangju (KR); Hyoungjun Park, Gwangju (KR); Dong Hoon Son, Jeollanam-do (KR); Chan Il Yeo, Gwangju (KR); Dongsoo Lee, Yongin-si (KR); Young Soon Heo, Gwangju (KR)

(73) Assignee: Electronics and Telecommunications Research Institute, Daejeon (KR)

(*) Notice: Subject to any disclaimer, the term of this patent is extended or adjusted under 35 U.S.C. 154(b) by 43 days.

(21) Appl. No.: 15/870,012

(22) Filed: Jan. 12, 2018

(65) Prior Publication Data
US 2019/0128733 A1    May 2, 2019

(30) Foreign Application Priority Data
Nov. 1, 2017    (KR) .......................... 10-2017-0144627

(51) Int. Cl.
*G01J 3/02*  (2006.01)
*G01J 3/12*  (2006.01)
(Continued)

(52) U.S. Cl.
CPC .............. *G01J 3/0218* (2013.01); *G01J 3/021* (2013.01); *G01J 3/0205* (2013.01); *G01J 3/12* (2013.01); *G01J 3/2803* (2013.01); *G01J 3/42* (2013.01)

(58) Field of Classification Search
CPC ...... G01J 3/0218; G01J 3/0229; G01J 3/0272; G01J 3/32; G01J 3/44; G01J 3/4412;
(Continued)

(56) References Cited

U.S. PATENT DOCUMENTS

| 4,097,743 A * | 6/1978 | Carlson | G01N 21/314 |
| | | | 250/339.1 |
| 4,305,663 A * | 12/1981 | Perkins | G01J 3/06 |
| | | | 356/323 |

(Continued)

FOREIGN PATENT DOCUMENTS

| KR | 101556399 B1 | 10/2015 |
| KR | 1020160052992 A | 5/2016 |

(Continued)

*Primary Examiner* — Mohamed K Amara
(74) *Attorney, Agent, or Firm* — William Park & Associates Ltd.

(57) ABSTRACT

Disclosed is a spectroscopic device including a planar lightwave circuit to which light passing through an optical fiber is input, a wavelength divider configured to divide a wavelength of light passing through the planar lightwave circuit, a beam splitter configured to divide a traveling direction of light passing through the wavelength divider into an external sample inlet and an internal sample inlet and adjust power of the divided light, a charge-coupled device (CCD) image sensor configured to covert light transmitted from the internal sample inlet to an electrical signal or convert light reflected by the external sample inlet to an electrical signal, a control and signal processor configured to process the electrical signal to indicate a light intensity based on each wavelength, and an input and output interface configured to perform a spectrum analysis for each wavelength using the processed electrical signal.

4 Claims, 13 Drawing Sheets

(51) Int. Cl.
*G01J 3/28* (2006.01)
*G01J 3/42* (2006.01)

(58) Field of Classification Search
CPC ..... H01L 2224/48091; H01L 2924/181; H01L 2924/00012; H01L 2924/00014; G01N 21/274; G01N 21/314; G01N 21/65; G01N 2201/06113; G02B 2006/12107; G02B 2006/12109; G02B 6/12007; G02B 6/1221; G02B 6/124; G02B 6/13; G02B 6/4201; G02B 6/4204; G02B 6/4237; G02B 6/4246; H01S 5/02216; H01S 5/02252; H01S 5/02284; H01S 5/02415; H01S 5/02438; H01S 5/0612; H01S 5/141; H01S 5/146; H04Q 11/0005; H04Q 2011/0016; H04Q 2011/0035; H04Q 2011/0052

See application file for complete search history.

(56) References Cited

U.S. PATENT DOCUMENTS

| | | | | |
|---|---|---|---|---|
| 4,795,256 A * | 1/1989 | Krause | | G01J 3/427 |
| | | | | 356/318 |
| 5,459,313 A * | 10/1995 | Schrader | | G01N 21/9081 |
| | | | | 250/223 B |
| 5,526,121 A * | 6/1996 | Sandifer | | G01J 3/02 |
| | | | | 250/351 |
| 5,999,255 A * | 12/1999 | Dupee | | G01J 3/02 |
| | | | | 356/301 |
| 6,281,971 B1 * | 8/2001 | Allen | | G01J 3/02 |
| | | | | 356/301 |
| 6,577,799 B1 | 6/2003 | Charters et al. | | |
| 6,621,574 B1 * | 9/2003 | Forney | | G01J 3/02 |
| | | | | 250/252.1 |
| 6,717,668 B2 * | 4/2004 | Treado | | G01B 11/2545 |
| | | | | 356/300 |
| 6,753,961 B1 * | 6/2004 | Norton | | G01J 3/447 |
| | | | | 356/364 |
| 6,897,951 B2 * | 5/2005 | Womble | | G01N 21/276 |
| | | | | 356/301 |
| 6,943,353 B2 * | 9/2005 | Elmore | | G01J 3/02 |
| | | | | 250/339.02 |
| 7,277,187 B2 * | 10/2007 | Smith | | G01B 11/00 |
| | | | | 340/928 |
| 7,277,210 B2 * | 10/2007 | Lipson | | G01J 3/02 |
| | | | | 356/320 |
| 7,339,170 B2 * | 3/2008 | Deliwala | | G01J 3/02 |
| | | | | 250/351 |
| 7,408,639 B1 * | 8/2008 | Strasser | | G02B 6/2706 |
| | | | | 356/328 |
| 7,502,105 B2 * | 3/2009 | Lee | | G01J 3/44 |
| | | | | 356/301 |
| 8,994,938 B2 | 3/2015 | Day et al. | | |
| 9,134,538 B1 * | 9/2015 | Augst | | G02B 27/106 |
| 9,557,217 B2 * | 1/2017 | Zimenkov | | G01J 3/10 |
| 9,557,261 B2 | 1/2017 | Yada et al. | | |
| 10,386,300 B2 * | 8/2019 | Wu | | G01J 3/4406 |
| 10,451,553 B2 * | 10/2019 | Yamazaki | | G01N 27/447 |
| 2004/0008259 A1 * | 1/2004 | Gokturk | | G01B 11/2509 |
| | | | | 348/207.1 |
| 2006/0034569 A1 * | 2/2006 | Shih | | G01D 5/35383 |
| | | | | 385/39 |
| 2006/0051030 A1 | 3/2006 | Lee et al. | | |
| 2006/0238745 A1 * | 10/2006 | Hashimoto | | G01J 3/44 |
| | | | | 356/73 |
| 2007/0132994 A1 * | 6/2007 | Kobayashi | | G01J 3/02 |
| | | | | 356/328 |
| 2010/0008670 A1 | 1/2010 | Shin et al. | | |
| 2010/0119231 A1 | 5/2010 | Kim et al. | | |
| 2010/0182605 A1 * | 7/2010 | Stockwell | | G01J 3/12 |
| | | | | 356/436 |
| 2010/0328659 A1 * | 12/2010 | Bodkin | | G01J 3/02 |
| | | | | 356/326 |
| 2011/0286007 A1 * | 11/2011 | Pangrazio | | G01B 11/00 |
| | | | | 356/614 |
| 2014/0104416 A1 * | 4/2014 | Giordano | | G01B 11/02 |
| | | | | 348/135 |
| 2014/0183362 A1 * | 7/2014 | Islam | | G01J 3/453 |
| | | | | 250/338.4 |
| 2015/0009338 A1 * | 1/2015 | Laffargue | | G01F 25/0084 |
| | | | | 348/175 |
| 2015/0346101 A1 * | 12/2015 | Zhao | | G01N 21/47 |
| | | | | 356/301 |
| 2016/0320306 A1 * | 11/2016 | Huffman | | G01N 21/85 |
| 2019/0008388 A1 * | 1/2019 | Ando | | G01J 3/0218 |
| 2019/0086260 A1 * | 3/2019 | Zhang | | G01J 3/0256 |

FOREIGN PATENT DOCUMENTS

| | | |
|---|---|---|
| KR | 1020160117416 A | 10/2016 |
| KR | 1020160138124 A | 12/2016 |
| WO | 2005069516 A1 | 7/2005 |

* cited by examiner

SPECTROSCOPIC DEVICE

CROSS-REFERENCE TO RELATED APPLICATION(S)

This application claims the priority benefit of Korean Patent Application No. 10-2017-0144627 filed on Nov. 1, 2017, in the Korean Intellectual Property Office, the disclosure of which is incorporated herein by reference for all purposes.

BACKGROUND

1. Field

One or more example embodiments relate to a spectroscopic device using a planar lightwave circuit, and more particularly, to a spectroscopic device that selectively includes a sample inlet based on light transmitted from or reflected by a sample of which a spectral characteristic is to be analyzed.

2. Description of Related Art

A prism or a diffraction grating was generally used as an optical element applied to a spectroscopic device to which light is input through a slit, a small hole such as a pinhole. The light passing through or transmitted from such a slit is divided into wavelengths based on an internal configuration of the spectroscopic device.

SUMMARY

An aspect provides a spectroscopic device configured to analyze a spectral characteristic of a sample using a planar lightwave circuit in lieu of a slit, which is a small hole such as a pinhole.

Another aspect also provides a spectroscopic device that selectively includes a sample inlet based on an amount of light transmitted from or reflected by a sample used to analyze a spectral characteristic thereof.

Still another aspect also provides various spectroscopic devices by combining wavelengths divided by a planar lightwave circuit with a prism or a diffraction grating.

According to an example embodiment, there is provided a spectroscopic device including a planar lightwave circuit to which light passing through an optical fiber is input, a wavelength divider configured to divide a wavelength of light passing through the planar lightwave circuit, a beam splitter configured to divide a traveling direction of light passing through the wavelength divider into an external sample inlet and an internal sample inlet and to adjust power of the divided light, a charge-coupled device (CCD) image sensor configured to convert light transmitted from the internal sample inlet to an electrical signal or convert light reflected by the external sample inlet to an electrical signal, a control and signal processor configured to process the electrical signal to indicate a light intensity based on each wavelength, and an input and output interface configured to perform a spectrum analysis for each wavelength using the processed electrical signal.

The spectroscopic device may further include a wavelength divider configured to divide more finely the wavelength of the light passing through the planar lightwave circuit, than the planar lightwave circuit.

The planar lightwave circuit may function as a slit by inputting the light to one port and outputting the light through one port, or to divide a wavelength of the light.

The spectroscopic device may use at least one of the internal sample inlet or the external sample inlet based on an amount of light transmitted from or reflected by a sample.

The spectroscopic device may further include a lens configured to allow the light to pass therethrough, and the lens may be disposed at an output end of the planar lightwave circuit or an output end of the wavelength divider, or an output end of the beam splitter or an input end of the CCD image sensor.

According to another example embodiment, there is provided a spectroscopic device including a planar lightwave circuit to which light passing through an optical fiber is input, a wavelength divider configured to divide a wavelength of light passing through the planar lightwave circuit, a lens configured to allow light passing through the wavelength divider to pass therethrough, a sample inlet configured to transmit light passing through the lens with divided wavelengths, a CCD image sensor configured to convert light transmitted through the sample inlet to an electrical signal, a control and signal processor configured to process the electrical signal to indicate a light intensity based on each wavelength, and an input and output interface configured to perform a spectrum analysis for each wavelength using the processed electrical signal.

The planar lightwave circuit may function as a slit by inputting the light to one port and outputting the light through one port, or to divide a wavelength of the light.

An output end of the planar lightwave circuit may be inclined at a predetermined angle to change a path of the light.

The wavelength divider may include a reflection-type wavelength divider or a transmission-type wavelength divider. The reflection-type wavelength divider may divide more finely the wavelength of the light than the planar lightwave circuit by reflecting the light. The transmission-type wavelength divider may divide more finely the wavelength of the light than the planar lightwave circuit by transmitting the light.

The planar lightwave circuit may be inclined at a predetermined angle from the reflection-type wavelength divider or the transmission-type wavelength divider, or may be parallel to the reflection-type wavelength divider or the transmission-type wavelength divider.

The sample inlet may be disposed at an input end of the optical fiber or an output end of the lens.

The lens may be disposed at an output end of the transmission-type wavelength divider or the reflection-type wavelength divider, or at the output end of the planar lightwave circuit.

According to still another example embodiment, a spectroscopic device including a planar lightwave circuit to which light passing through an optical fiber is input, a wavelength divider configured to divide a wavelength of light passing through the planar lightwave circuit, a mirror configured to reflect the light with divided wavelengths, a sample inlet configured to transmit light with the divided wavelengths that is reflected by the mirror, a CCD image sensor configured to convert light transmitted through the sample inlet to an electrical signal, a control and signal processor configured to process the electrical signal to indicate a light intensity based on each wavelength, and an input and output interface configured to perform a spectrum analysis for each wavelength using the processed electrical signal.

The planar lightwave circuit may function as a slit by inputting the light to one port and outputting the light through one port, or to divide a wavelength of the light.

An output end of the planar lightwave circuit may be inclined at a predetermined angle to change a path of the light with the divided wavelengths.

The wavelength divider may be a reflection-type wavelength divider or a transmission-type wavelength divider. The reflection-type wavelength divider may divide more finely the wavelength of the light than the planar lightwave circuit by reflecting the light. The transmission-type wavelength divider may divide more finely the wavelength of the light than the planar lightwave circuit by transmitting the light.

The planar lightwave circuit may be inclined at a predetermined angle from the reflection-type wavelength divider or the transmission-type wavelength divider, or may be parallel to the reflection-type wavelength divider or the transmission-type wavelength divider.

The sample inlet may be disposed at an input end of the optical fiber or in a traveling direction of the light reflected by the mirror.

According to yet another example embodiment, there is provided a spectroscopic device including a planar lightwave circuit to which light passing through an optical fiber is input, a beam splitter configured to adjust light passing through the planar lightwave circuit to proceed to a sample inlet and adjust light reflected from the sample inlet to proceed to a wavelength divider, the wavelength divider configured to divide a wavelength of light output from the beam splitter, a CCD image sensor configured to convert the light with the divided wavelengths to an electrical signal, a control and signal processor configured to process the electrical signal to indicate a light intensity based on each wavelength, and an input and output interface configured to perform a spectrum analysis for each wavelength using the processed electrical signal.

The planar lightwave circuit may function as a slit by inputting the light to one port and outputting the light through one port, or to divide a wavelength of the light.

The wavelength divider may be a reflection-type wavelength divider. The reflection-type wavelength divider may divide more finely the wavelength of the light than the planar lightwave circuit by reflecting the light.

The sample inlet may be disposed inside or outside the spectroscopic device.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
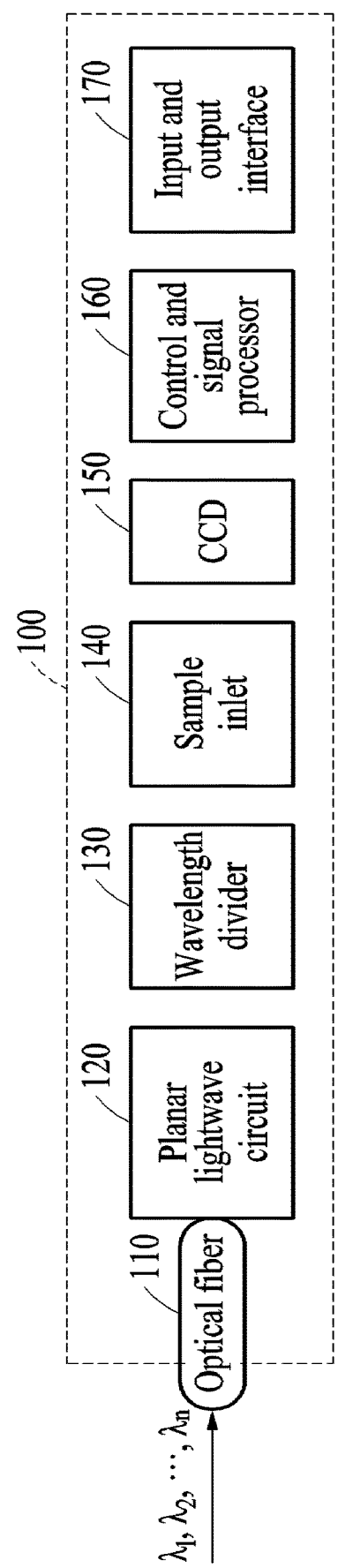
FIG. 1 is a diagram illustrating a spectroscopic device using a planar lightwave circuit according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating a spectroscopic device using a planar lightwave circuit according to an example embodiment.

Referring to FIG. 1, white light is input to a planar lightwave circuit 120 through an optical fiber 110. An output end of the optical fiber 110 is connected to an input end of the planar lightwave circuit 120, and thus the white light passing through the optical fiber 110 is input to the planar lightwave circuit 120. The white light used herein refers to light in which light with all wavelengths are mixed equally. The white light is used herein as an example of light to be input to the planar lightwave circuit 120 through the optical fiber 110. Thus, the light may include, for example, visible light, ultraviolet light, and infrared light, in addition to the white light.

The planar lightwave circuit 120 to which the white light is input through the optical fiber 110 may function as a slit with one port to which the light is input and one port from which the light is output, or may divide a wavelength of the light and output the light with the divided wavelengths. The planar lightwave circuit 120 having such a function of inputting the light to the one port and outputting the light through the one port may output wavelengths, for example, $\lambda_1, \lambda_2, \ldots, \lambda_n$, of the input white light to a same location.

Alternatively, the planar lightwave circuit 120 configured to divide the wavelength of the light may output, from an output end thereof, the white light to different locations based on the wavelengths $\lambda_1, \lambda_2, \ldots, \lambda_n$.

When the wavelength of the light is divided while passing through the planar lightwave circuit 120, the white light is more finely divided into wavelengths with smaller intervals between the wavelengths, for example, $\lambda_{11}, \lambda_{12}, \ldots, \lambda_{21}, \lambda_{22}, \ldots, \lambda_{nn}$, while passing through a wavelength divider 130, than an optical signal output from the planar lightwave circuit 120. Thus, the white light with the more finely divided wavelengths may be output to different locations from an output end of the wavelength divider 130 based on each wavelength.

The white light passing through the wavelength divider 130 is input to a sample inlet 140. The sample inlet 140 includes a sample of which a spectral characteristic is to be analyzed. The white light with the divided wavelengths may react to the sample included in the sample inlet 140. Here, output power of light output from an output end of the sample inlet 140 may vary in terms of a light absorption amount, a light reflection amount, and a light transmission amount of each of samples or substances based on a concentration by each wavelength that reacts to a sample or a substance.

A charge-coupled device (CCD) 150 used herein refers to a CCD image sensor including a CCD structure. The CCD 150 converts light passing through the sample inlet 140 to an electrical signal. The electrical signal is input to a control and signal processor 160. The control and signal processor 160 used herein refers to a processing device configured to convert light to an electrical value to indicate a light intensity based on each wavelength, and output the electrical value with an x axis indicating a wavelength and a y axis indicating an intensity. The electrical signal processed by the control and signal processor 160 is used by an input and output interface 170 for various spectroscopic functions such as a spectrum analysis for each wavelength, for example, a transmittance and an absorbance of a sample or a substance based on each wavelength.

According to an example embodiment, a spectroscopic device 100 may be used to perform various analyses such as an optical analysis, a biological tissue analysis, a substance element analysis, a surface analysis, and a water quality analysis.

Figure 2:
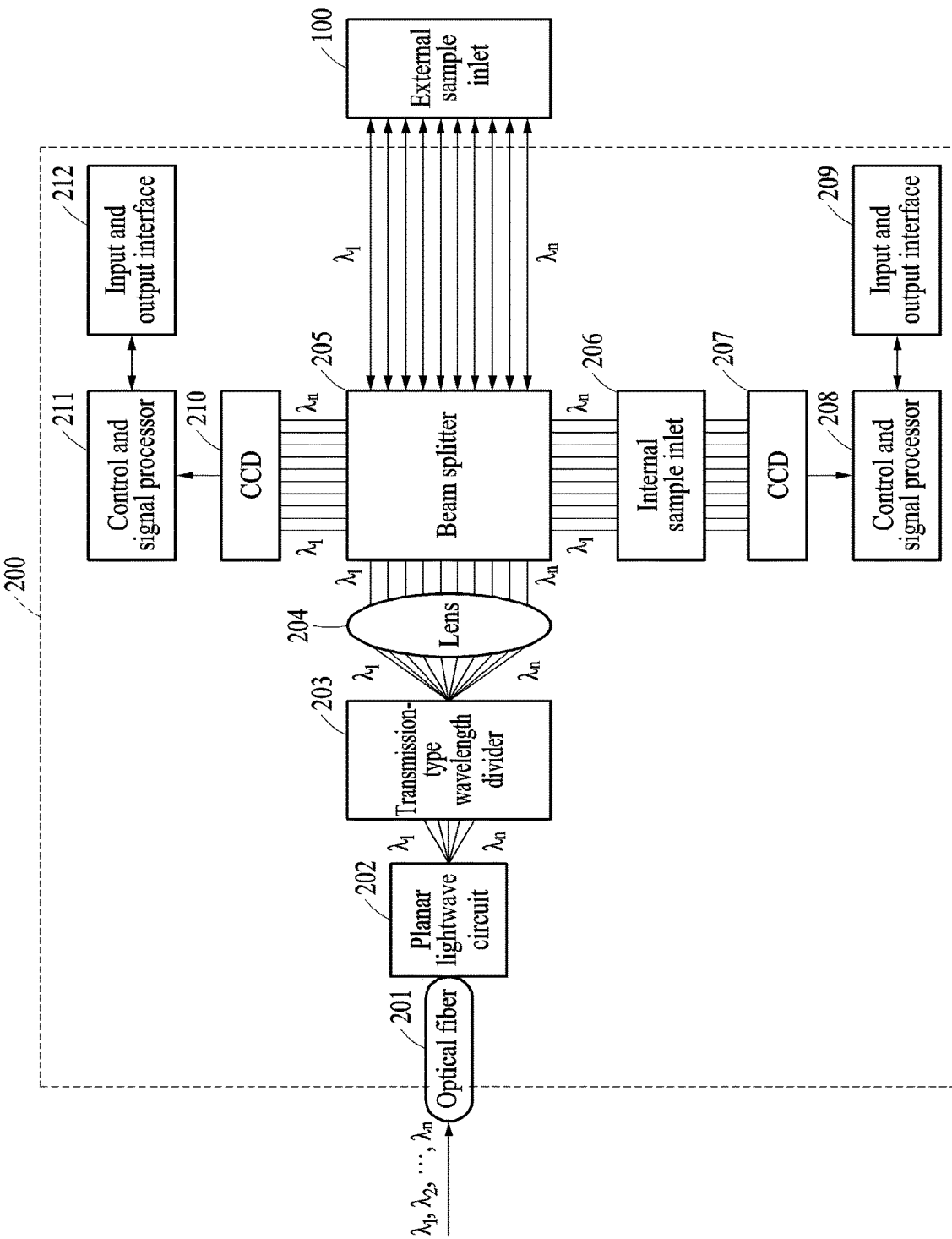
FIG. 2 is a diagram illustrating a spectroscopic device using a planar lightwave circuit and a beam splitter according to an example embodiment.

FIG. 2 is a diagram illustrating a spectroscopic device using a planar lightwave circuit and a beam splitter according to an example embodiment.

Referring to FIG. 2, light, such as white light, in which a plurality of wavelengths is combined is transferred to a planar lightwave circuit 202 through an optical fiber 201, for example, a thin glass and a plastic fiber. That is, an output end of the optical fiber 201 is connected to an input end of the planar lightwave circuit 202.

The output end of the optical fiber 201 is connected to the input end of the planar lightwave circuit 202, which enables a function as a slit. Because a resolution may vary based on a size of a slit, the resolution may be improved by decreasing a size of an input end of the optical fiber 201 to which the light is input.

For the function as a slit, the white light input to the planar lightwave circuit 202 may be input to one port and then output through one port, or a wavelength of the white light may be divided to be output. An output of the planar lightwave circuit 202 having a function of wavelength division may output light with the divided wavelengths to different locations based on each of the divided wavelengths.

Alternatively, the output end of the planar lightwave circuit 202 having such a function as a slit may output the input wavelength to a same location.

The light with the divided wavelengths is input to a wavelength divider 203. The wavelength divider 203 more finely divides the light into wavelengths with smaller intervals, for example, $\lambda_{11}, \lambda_{12}, \ldots, \lambda_{21}, \lambda_{22}, \ldots, \lambda_{nn}$, than an optical signal output from the planar lightwave circuit 202 having the function of wavelength division. Here, the wavelength divider 203 may be omitted, and a spectroscopic device 200 may be configured without the wavelength divider 203.

The wavelength divider 203 may include a transmission-type wavelength divider and a reflection-type wavelength divider. The transmission-type wavelength divider may divide more finely a wavelength of input light than the planar lightwave circuit 202, by transmitting the input light. The reflection-type wavelength divider may divide more finely a wavelength of input light than the planar lightwave circuit 202, by reflecting the input light.

As illustrated, light output from the transmission-type wavelength divider is input to a beam splitter 205 through a lens 204. The lens 204 may include various types of lenses, for example, a focusing lens and a collimation lens.

The lens 204 may be disposed at an output end of the transmission-type wavelength divider, or at the output end of the planar lightwave circuit 202. Alternatively, the lens 204 may be additionally attached to an output end of the beam splitter 205 or input ends of CCDs 207 and 210.

A portion of the light input to the beam splitter 205 proceeds towards an external sample inlet 100, or a remaining portion of the light proceeds towards an internal sample inlet 206. The external sample inlet 100 refers to a sample inlet disposed outside the spectroscopic device 200. Alternatively, the external sample inlet 100 may be used as a separate sample inlet, or replaced with a target for a spectroscopic analysis provided at a location of the external sample inlet 100.

The internal sample inlet 206 includes a sample on which a spectroscopic analysis is performed in the spectroscopic device 200. Light passing through the internal sample inlet 206 is input to the CCD 207, and is converted to an electrical signal through the CCD 207. The electrical signal is converted to an electrical value through a control and signal processor 208 to indicate a light intensity based on each wavelength. Here, the control and signal processor 208 performs signal and data processing with an x axis indicating a wavelength and a y axis indicating a light intensity. A signal output from the control and signal processor 208 is used by an input and output interface 209 for various spectroscopic functions such as a spectrum analysis for each wavelength.

Light reflected from the external sample inlet 100 is input again to the beam splitter 205, and a path of the light is changed to be input to the CCD 210 and the input light is converted to an electrical signal. The control and signal processor 208 performs signal and data processing on the electrical signal. A signal output from the control and signal processor 208 is used by the input and output interface 209 for various spectroscopic functions such as a spectrum analysis for each wavelength.

The beam splitter 205 changes a path of the light to the internal sample inlet 206 and the external sample inlet 100. When the light proceeds to a sample or a substance, a reflected amount and a transmitted amount of the light may differ from samples or substances, and thus the beam splitter 205 adjusts power of the light of which the path is changed. For example, a light absorption amount, a light reflection amount, and a light transmission amount may differ from samples, and thus power of light proceeding to the internal sample inlet 206 and the external sample inlet 100, for example, a ratio between power of light proceeding to an internal sample inlet and power of light proceeding to an external sample inlet, may be adjusted variously, for example, 50%:50%, 40%:60%, or 30%:70%, in order to increase an output, or the power, of the light to be input to a CCD.

The internal sample inlet 206 may be omitted from the spectroscopic device 200. Also, a target for a spectroscopic analysis may be directly provided at a location of the external sample inlet 100 without using the external sample inlet 100 as a separate sample inlet.

According to an example embodiment, based on an amount of light transmitted from or reflected by a sample, a sample inlet may be selectively used. For example, in a case in which an amount of light transmitted from a sample is relatively greater than an amount of light reflected by the sample, the internal sample inlet 206 may be used. Conversely, in a case in which the amount of the light reflected by the sample is relatively greater than the amount of the light transmitted from the sample, the external sample inlet 100 may be used. In addition, in a case in which the amount of the light transmitted from the sample and the amount of the light reflected by the sample are similar to each other, light reflected only using the internal sample inlet 206 may proceed to the CCD 210 through the beam splitter 205, and light transmitted from the internal sample inlet 206 may proceed to the CCD 207. Light passing through the CCDs 207 and 210 may be used to analyze a spectral characteristic through control and signal processors 208 and 211.

Figure 3:
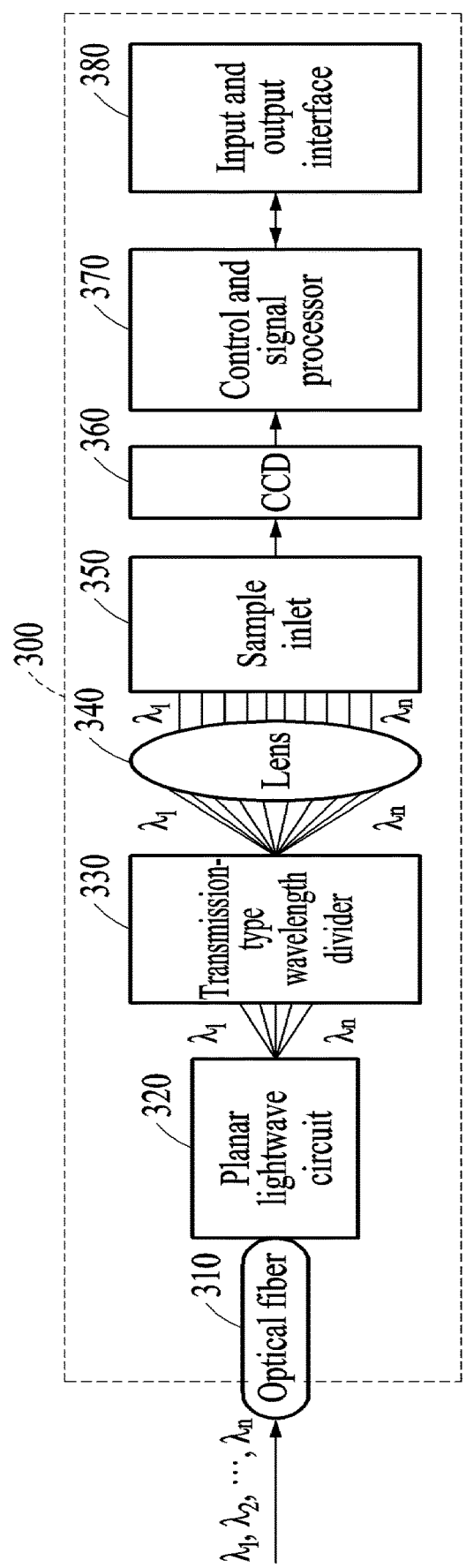
FIG. 3 is a diagram illustrating a spectroscopic device using a planar lightwave circuit and a transmission-type wavelength divider according to an example embodiment.

FIG. 3 is a diagram illustrating a spectroscopic device using a planar lightwave circuit and a transmission-type wavelength divider according to an example embodiment.

Referring to FIG. 3, light, such as white light, in which a plurality of wavelengths is combined is transferred to a planar lightwave circuit 320 through an optical fiber 310, for example, a thin glass and a plastic fiber. That is, an output end of the optical fiber 310 is connected to an input end of the planar lightwave circuit 320.

The output end of the optical fiber 310 is connected to the input end of the planar lightwave circuit 320, which enables a function as a slit. Because a resolution may vary based on a size of a slit, the resolution may be improved by decreasing a size of an input end of the optical fiber 310 to which the light is input.

The white light input to the planar lightwave circuit 320 is divided into wavelengths while passing through the planar lightwave circuit 320. Thus, an output end of the planar lightwave circuit 320 outputs light with the divided wavelengths to different locations based on each of the divided wavelengths.

The light with the divided wavelengths is input to a transmission-type wavelength divider 330. The transmission-type wavelength divider 330 divides the input light into finer wavelengths by transmitting the input light. The transmission-type wavelength divider 330 may be omitted, and a spectroscopic device 300 may be configured without the transmission-type wavelength divider 330.

Light output from the transmission-type wavelength divider 330 is input to a sample inlet 350 through a lens 340. According to an example embodiment, the lens 340 of the spectroscopic device 300 may be disposed at an output end of the transmission-type wavelength divider 330 or the output end of the planar lightwave circuit 320. According to another example embodiment, the lens 340 may be omitted from the spectroscopic device 300, and the light passing through the output end of the transmission-type wavelength divider 330 may be input directly to the sample inlet 350. Here, the sample inlet 350 may be an internal sample inlet.

Light passing through the sample inlet 350 is input to a CCD 360, and converted to an electrical signal through the CCD 360. The electrical signal is processed by a control and signal processor 370 to indicate a light intensity based on each wavelength. A signal output from the control and signal processor 370 is used by an input and output interface 380 for various spectroscopic functions, for example, a spectrum analysis for each wavelength including, for example, a transmission or transmittance, and an absorbance of a sample or a substance based on a concentration for each wavelength that reacts to the sample or substance.

As necessary, the sample inlet 350 may be omitted from the spectroscopic device 300, or disposed before the optical fiber 310. For example, the spectroscopic device 300 without the sample inlet 350, or the spectroscopic device 300 in which the sample inlet 350 is disposed before the optical fiber 310 may also be configured.

Figure 4:
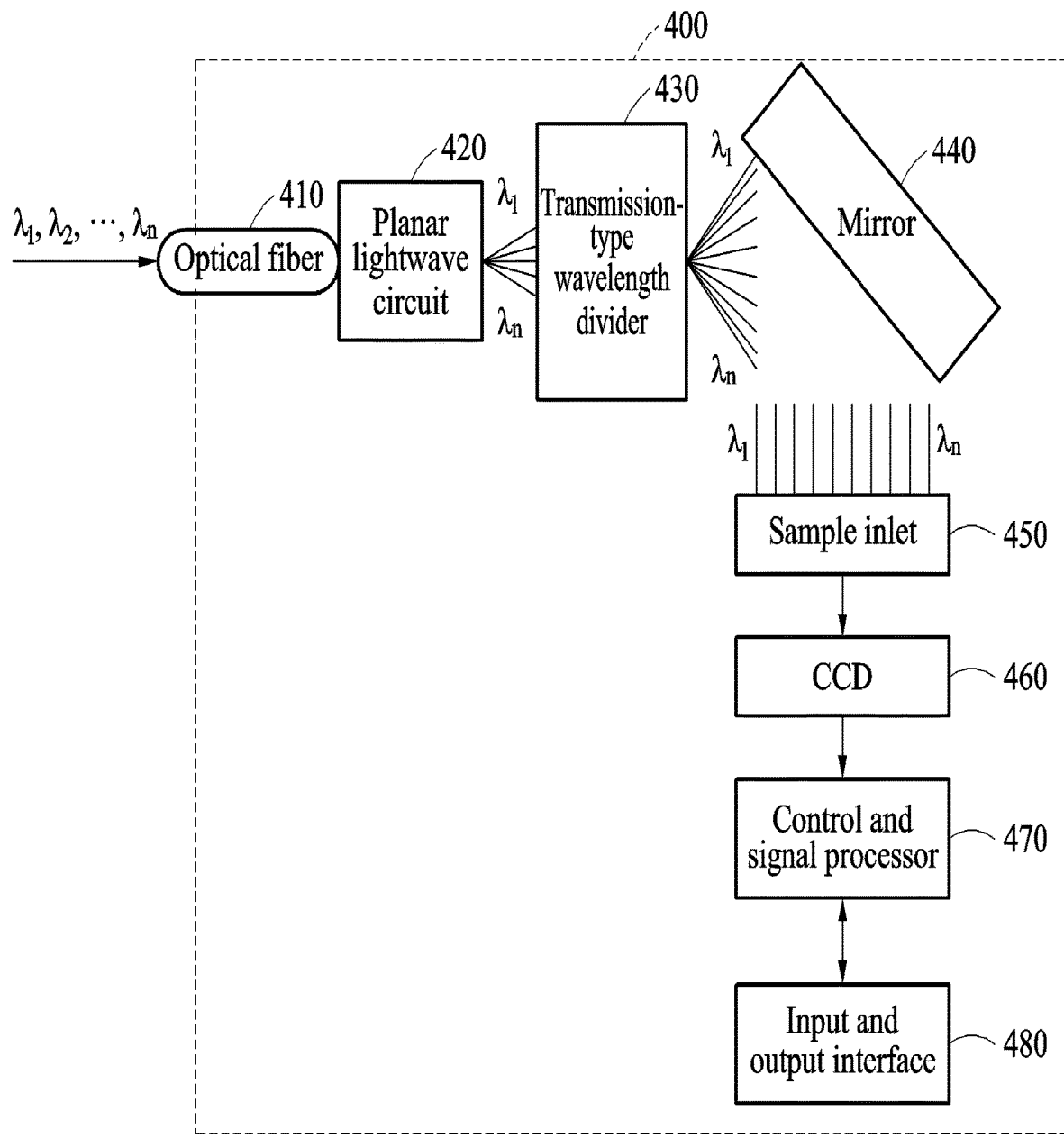
FIG. 4 is a diagram illustrating a spectroscopic device using a planar lightwave circuit, a transmission-type wavelength divider, and a mirror according to an example embodiment.

FIG. 4 is a diagram illustrating a spectroscopic device using a planar lightwave circuit, a transmission-type wavelength divider, and a mirror according to an example embodiment.

Referring to FIG. 4, light, such as white light, in which a plurality of wavelengths is combined is transferred to a planar lightwave circuit 420 through an optical fiber 410, for example, a thin glass and a plastic fiber. That is, an output end of the optical fiber 410 is connected to an input end of the planar lightwave circuit 420.

The output end of the optical fiber 410 is connected to the input end of the planar lightwave circuit 420, which enables a function as a slit. Because a resolution may vary based on a size of a slit, the resolution may be improved by decreasing a size of an input end of the optical fiber 410 to which the light is input.

The white light input to the planar lightwave circuit 420 is divided into wavelengths while passing through the planar lightwave circuit 420. Thus, an output end of the planar lightwave circuit 420 outputs light with the divided wavelengths to different locations based on each of the divided wavelengths.

The light with the divided wavelengths is input to a transmission-type wavelength divider 430. The transmission-type wavelength divider 430 divides the input light into finer wavelengths by transmitting the input light. The transmission-type wavelength divider 430 may be omitted, and a spectroscopic device 400 may be configured without the transmission-type wavelength divider 430.

Light output from the transmission-type wavelength divider 430 is reflected by a mirror 440, and a path of the light is then changed. The light of which the path is changed is input to a sample inlet 450. The mirror 440 may include, for example, a concave mirror.

The spectroscopic device 400 may further include a lens in addition to the mirror 440. In such a case, the lens may be disposed at an output end of the transmission-type wavelength divider 430 or the output end of the planar lightwave circuit 420 of the spectroscopic device 400.

Light passing through the sample inlet 450 is input to a CCD 460, and converted to an electrical signal through the CCD 460. The electrical signal is processed by a control and signal processor 470 to indicate a light intensity based on each wavelength. A signal output from the control and signal processor 470 is used, through an input and output interface 480, for various spectroscopic functions, for example, a spectrum analysis for each wavelength.

As necessary, the sample inlet 450 may be omitted from the spectroscopic device 400, or disposed before the optical fiber 410.

Figure 5:
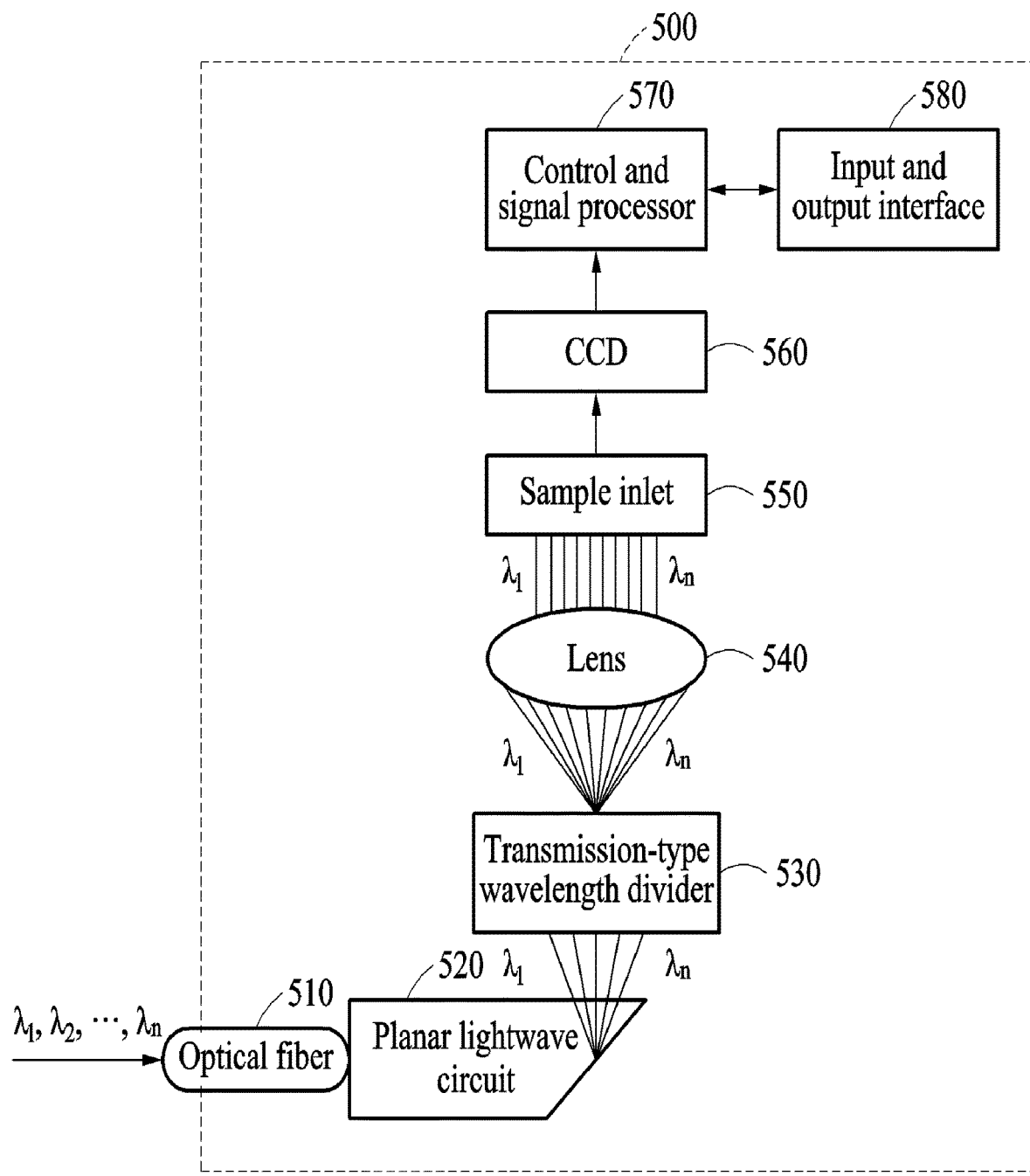
FIG. 5 is a diagram illustrating a spectroscopic device using a planar lightwave circuit configured to change a path of light and a transmission-type wavelength divider according to an example embodiment.

FIG. 5 is a diagram illustrating a spectroscopic device using a planar lightwave circuit configured to change a path of light and a transmission-type wavelength divider according to an example embodiment.

Referring to FIG. 5, light, such as white light, in which a plurality of wavelengths is combined is transferred to a planar lightwave circuit 520 through an optical fiber 510, for example, a thin glass and a plastic fiber. That is, an output end of the optical fiber 510 is connected to an input end of the planar lightwave circuit 520.

The output end of the optical fiber 510 is connected to the input end of the planar lightwave circuit 520, which enables a function as a slit. Because a resolution may vary based on a size of a slit, the resolution may be improved by decreasing a size of an input end of the optical fiber 510 to which the light is input.

The white light input to the planar lightwave circuit 520 is divided into wavelengths while passing through the planar lightwave circuit 520. Thus, an output end of the planar lightwave circuit 520 outputs light with the divided wavelengths to different locations based on each of the divided wavelengths.

According to an example embodiment, the output end of the planar lightwave circuit 520 may be inclined or etched at a predetermined angle to change a path of light. As illustrated, the output end of the planar lightwave circuit 520 is etched to be inclined at a predetermined angle. Thus, a path of the light with the divided wavelengths that is output from the etched output end of the planar lightwave circuit 520 is changed. A degree of such a change in the path is determined based on the etched angle. For example, when the output end is etched at 45 degrees (°), the path of the light may be changed by 90° to be output, for example, upwards as illustrated.

The light with the divided wavelengths is then input to a transmission-type wavelength divider 530. The transmission-type wavelength divider 530 divides the input light into finer wavelengths while the transmission-type wavelength divider 530 is transmitting the input light. The transmission-type wavelength divider 530 may be omitted, and a spectroscopic device 500 may be configured without the transmission-type wavelength divider 530.

Light output from the transmission-type wavelength divider 530 is input to a sample inlet 550 through a lens 540. According to an example embodiment, the lens 540 of the spectroscopic device 500 may be disposed at an output end of the transmission-type wavelength divider 530 or the output end of the planar lightwave circuit 520. According to another example embodiment, the lens 540 may be omitted from the spectroscopic device 500, and the light passing through the output end of the transmission-type wavelength divider 530 may be input directly to the sample inlet 550.

Light passing through the sample inlet 550 is input to a CCD 560, and converted to an electrical signal through the CCD 560. The electrical signal is processed by a control and signal processor 570 to indicate a light intensity based on each wavelength. A signal output from the control and signal processor 570 is used, through an input and output interface 580, for various spectroscopic functions, for example, a spectrum analysis for each wavelength.

As necessary, the sample inlet 550 may be omitted from the spectroscopic device 500, or disposed before the optical fiber 510.

Figure 6:
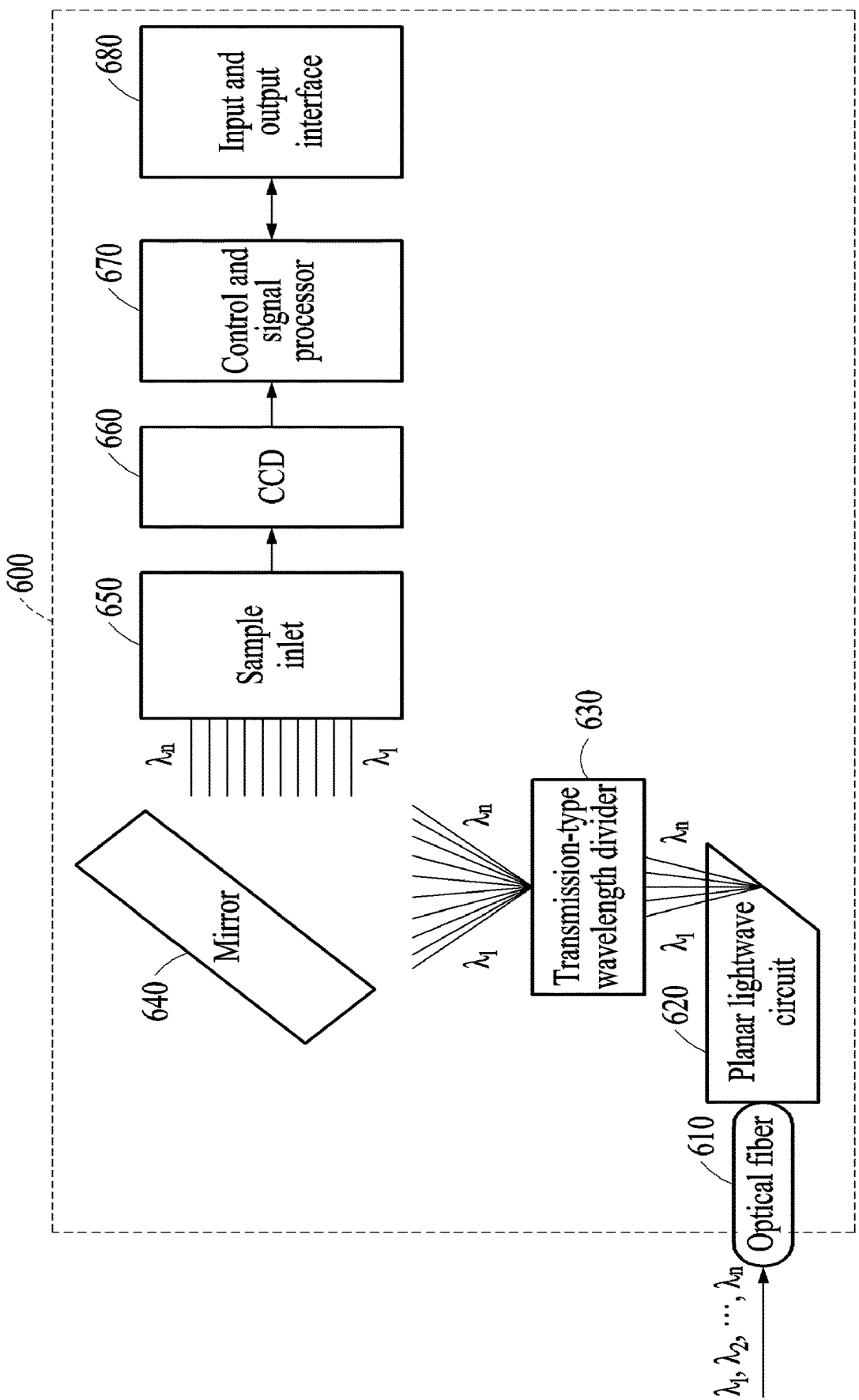
FIG. 6 is a diagram illustrating a spectroscopic device using a planar lightwave circuit configured to change a path of light, a transmission-type wavelength divider, and a mirror according to an example embodiment.

FIG. 6 is a diagram illustrating a spectroscopic device using a planar lightwave circuit configured to change a path of light, a transmission-type wavelength divider, and a mirror according to an example embodiment.

Referring to FIG. 6, light, such as white light, in which a plurality of wavelengths is combined is transferred to a planar lightwave circuit 620 through an optical fiber 610, for example, a thin glass and a plastic fiber. That is, an output end of the optical fiber 610 is connected to an input end of the planar lightwave circuit 620. A spectroscopic device 600 may include an optical fiber, for example, the optical fiber 610, but not limited thereto.

The output end of the optical fiber 610 is connected to the input end of the planar lightwave circuit 620, which enables a function as a slit. Because a resolution may vary based on a size of a slit, the resolution may be improved by decreasing a size of an input end of the optical fiber 610 to which the light is input.

The white light input to the planar lightwave circuit 620 is divided into wavelengths while passing through the planar lightwave circuit 620. Thus, an output end of the planar lightwave circuit 620 outputs light with the divided wavelengths to different locations based on each of the divided wavelengths.

According to an example embodiment, the output end of the planar lightwave circuit 620 may be inclined or etched at a predetermined angle to change a path of light. As illustrated, the output end of the planar lightwave circuit 620 is etched to be inclined at a predetermined angle. Thus, a path of the light with the divided wavelengths that is output from the etched output end of the planar lightwave circuit 620 is changed. A degree of such a change in the path is determined based on the etched angle.

The light with the divided wavelengths is then input to a transmission-type wavelength divider 630. The transmission-type wavelength divider 630 divides the input light into finer wavelengths while transmitting the input light. The transmission-type wavelength divider 630 may be omitted, and the spectroscopic device 600 may be configured without the transmission-type wavelength divider 630.

Light output from the transmission-type wavelength divider 630 is reflected by a mirror 640 and a path of the light is changed. The light of which the patch is changed is then input to a sample inlet 650.

The spectroscopic device 600 may further include a lens in addition to the mirror 640. In such a case, the lens may be disposed at an output end of the transmission-type wavelength divider 630 or the output end of the planar lightwave circuit 620 of the spectroscopic device 600.

Light passing through the sample inlet 650 is input to a CCD 660, and converted to an electrical signal through the CCD 660. The electrical signal is processed by a control and signal processor 670. A signal output from the control and signal processor 670 is used, through an input and output interface 680, for various spectroscopic functions, for example, a spectrum analysis for each wavelength.

As necessary, the sample inlet 650 may be omitted from the spectroscopic device 600, or disposed before the optical fiber 610.

Figure 7:
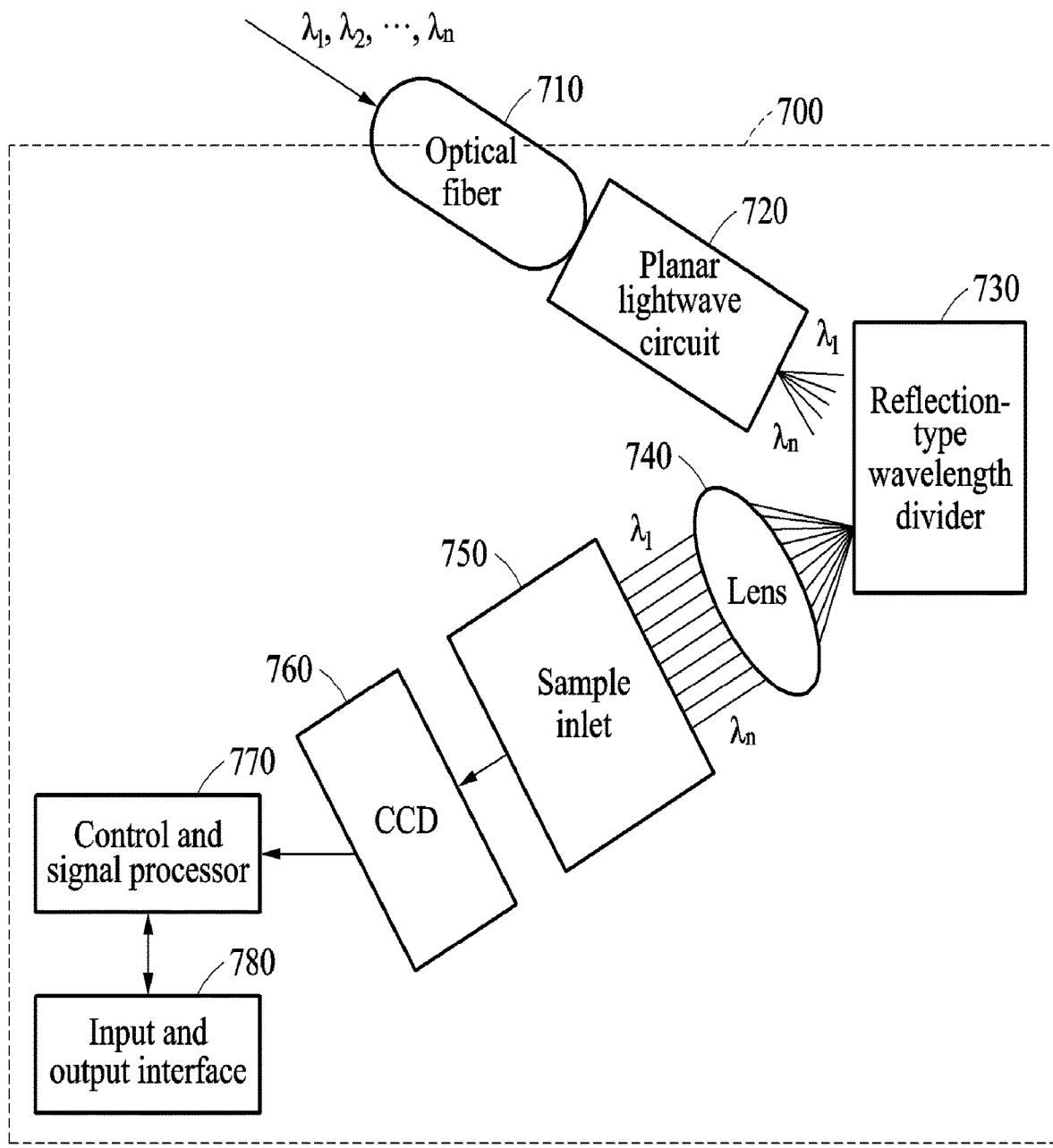
FIG. 7 is a diagram illustrating a spectroscopic device using a planar lightwave circuit and a reflection-type wavelength divider according to an example embodiment.

FIG. 7 is a diagram illustrating a spectroscopic device using a planar lightwave circuit and a reflection-type wavelength divider according to an example embodiment.

Referring to FIG. 7, light, such as white light, in which a plurality of wavelengths is combined is transferred to a planar lightwave circuit 720 through an optical fiber 710, for example, a thin glass and a plastic fiber. That is, an output end of the optical fiber 710 is connected to an input end of the planar lightwave circuit 720.

The output end of the optical fiber 710 is connected to the input end of the planar lightwave circuit 720, which enables a function as a slit. Because a resolution may vary based on a size of a slit, the resolution may be improved by decreasing a size of an input end of the optical fiber 710 to which the light is input.

The white light input to the planar lightwave circuit 720 is divided into wavelengths while passing through the planar lightwave circuit 720. Thus, an output end of the planar lightwave circuit 720 outputs light with the divided wavelengths to different locations based on each of the divided wavelengths.

The light with the divided wavelengths is input to a reflection-type wavelength divider 730. The reflection-type wavelength divider 730 divides the input light into finer wavelengths by reflecting the input light. The reflection-type wavelength divider 730 may be omitted, and a spectroscopic device 700 may be configured without the reflection-type wavelength divider 730.

Light reflected by the reflection-type wavelength divider 730 is then input to a sample inlet 750 through a lens 740. According to an example embodiment, the lens 740 may be disposed at an output end of the reflection-type wavelength divider 730 or the output end of the planar lightwave circuit 720 of the spectroscopic device 700. According to another example embodiment, the lens 740 may be omitted from the spectroscopic device 700, and the light reflected by the reflection-type wavelength divider 730 may be input directly to the sample inlet 750.

Light passing through the sample inlet 750 is input to a CCD 760, and converted to an electrical signal through the CCD 760. The electrical signal is processed by a control and signal processor 770 to indicate a light intensity based on each wavelength. A signal output from the control and signal processor 770 is used, through an input and output interface 780, for various spectroscopic functions, for example, a spectrum analysis for each wavelength.

As necessary, the sample inlet 750 may be omitted from the spectroscopic device 700, or disposed before the optical fiber 710.

Figure 8:
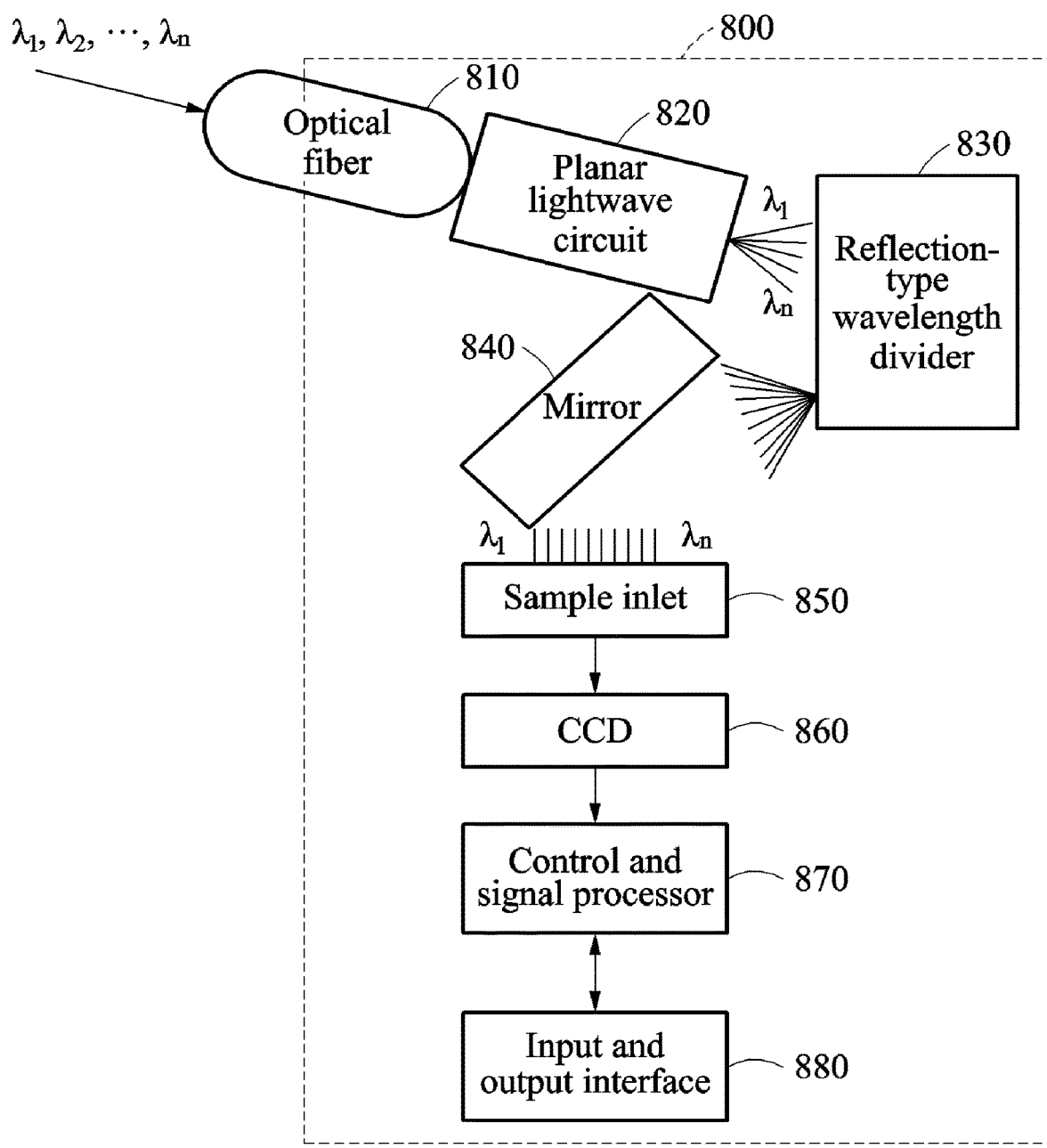
FIG. 8 is a diagram illustrating a spectroscopic device using a planar lightwave circuit, a reflection-type wavelength divider, and a mirror according to an example embodiment.

FIG. 8 is a diagram illustrating a spectroscopic device using a planar lightwave circuit, a reflection-type wavelength divider, and a mirror according to an example embodiment.

Referring to FIG. 8, light, such as white light, in which a plurality of wavelengths is combined is transferred to a planar lightwave circuit 820 through an optical fiber 810, for example, a thin glass and a plastic fiber. That is, an output end of the optical fiber 810 is connected to an input end of the planar lightwave circuit 820.

The output end of the optical fiber 810 is connected to the input end of the planar lightwave circuit 820, which enables a function as a slit. Because a resolution may vary based on a size of a slit, the resolution may be improved by decreasing a size of an input end of the optical fiber 810 to which the light is input.

The white light input to the planar lightwave circuit 820 is divided into wavelengths while passing through the planar lightwave circuit 820. Thus, an output end of the planar lightwave circuit 820 outputs light with the divided wavelengths to different locations based on each of the divided wavelengths.

According to an example embodiment, the planar lightwave circuit 820 and a reflection-type wavelength divider 830 may be inclined at a predetermined angle to change a path of light. Thus, as illustrated, the light output from the planar lightwave circuit 820 is reflected by the reflection-type wavelength circuit 830 and then input to a mirror 840.

Here, the light with the divided wavelengths that is output from the planar lightwave circuit 820 is input to the reflection-type wavelength divider 830. The reflection-type wavelength divider 830 divides the input light into finer wavelengths by reflecting the input light. The reflection-type wavelength divider 830 may be omitted, and a spectroscopic device 800 may be configured without the reflection-type wavelength divider 830.

Light reflected by the reflection-type wavelength divider 830 is reflected by the mirror 840 and a path of the light is changed. The light of which the patch is changed is then input to a sample inlet 850.

The spectroscopic device 800 may further include a lens in addition to the mirror 840. In such a case, the lens may be disposed at an output end of the reflection-type wavelength divider 830 or the output end of the planar lightwave circuit 820 of the spectroscopic device 800.

Light passing through the sample inlet 850 is input to a CCD 860, and converted to an electrical signal through the CCD 860. The electrical signal is processed by a control and signal processor 870 to indicate a light intensity based on each wavelength. A signal output from the control and signal processor 870 is used, through an input and output interface 880, for various spectroscopic functions, for example, a spectrum analysis for each wavelength.

As necessary, the sample inlet 850 may be omitted from the spectroscopic device 800, or disposed before the optical fiber 810.

Figure 9:
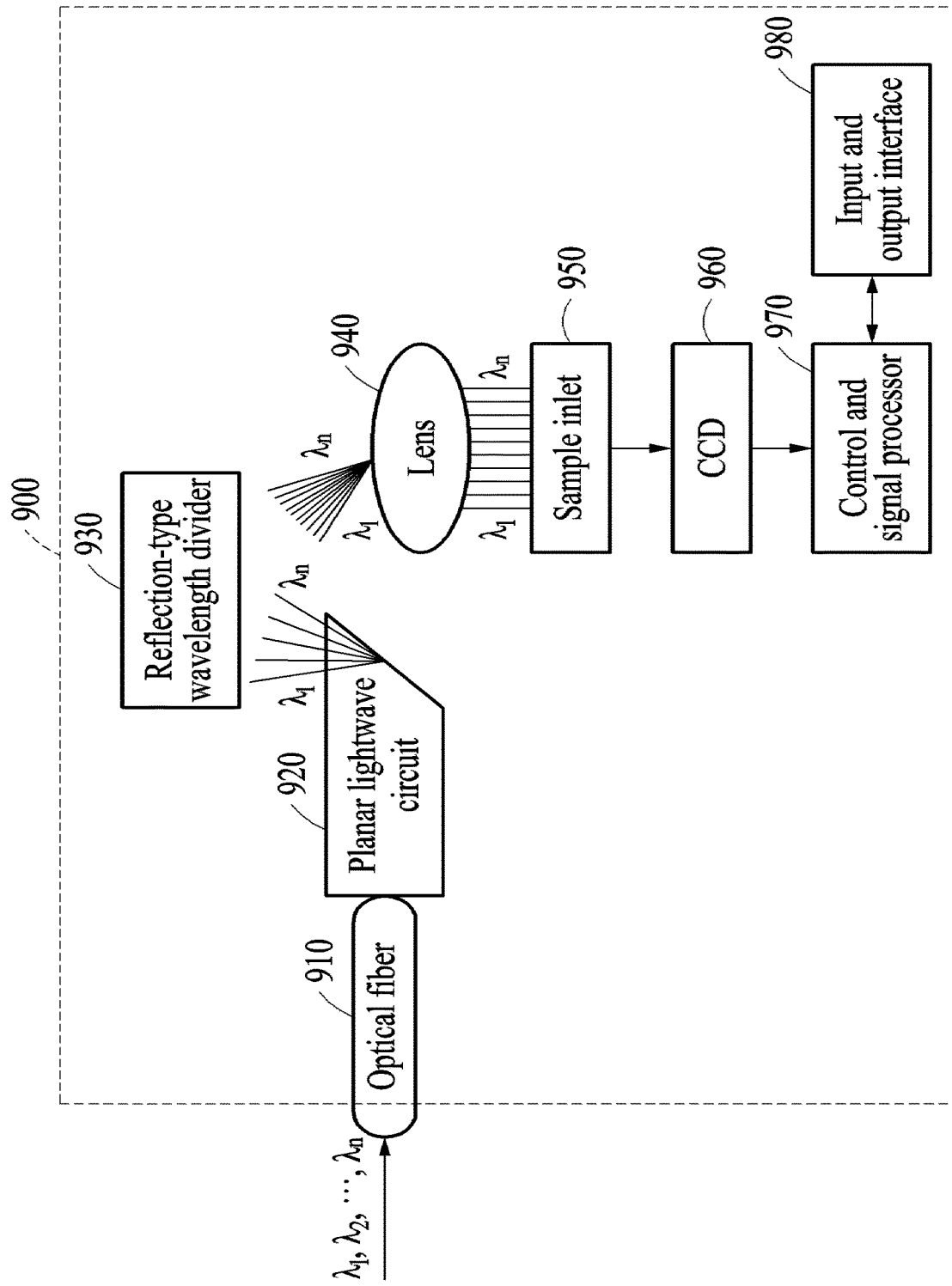
FIG. 9 is a diagram illustrating a spectroscopic device using a planar lightwave circuit configured to change a path of light and a reflection-type wavelength divider according to an example embodiment.

FIG. 9 is a diagram illustrating a spectroscopic device using a planar lightwave circuit configured to change a path of light and a reflection-type wavelength divider according to an example embodiment.

Referring to FIG. 9, light, such as white light, in which a plurality of wavelengths is combined is transferred to a planar lightwave circuit 920 through an optical fiber 910, for example, a thin glass and a plastic fiber. That is, an output end of the optical fiber 910 is connected to an input end of the planar lightwave circuit 920. The output end of the optical fiber 910 is connected to the input end of the planar lightwave circuit 920, which enables a function as a slit. Because a resolution may vary based on a size of a slit, the resolution may be improved by decreasing a size of an input end of the optical fiber 910 to which the light is input.

The white light input to the planar lightwave circuit 920 is divided into wavelengths while passing through the planar lightwave circuit 920. Thus, an output end of the planar lightwave circuit 920 outputs light with the divided wavelengths to different locations based on each of the divided wavelengths.

According to an example embodiment, the output end of the planar lightwave circuit 920 may be inclined or etched at a predetermined angle to change a path of light. As illustrated, the output end of the planar lightwave circuit 920 is etched to be inclined at a predetermined angle. Thus, a path of the light with the divided wavelengths that is output from the etched output end of the planar lightwave circuit 920 is changed. A degree of such a change in the path is determined based on the etched angle.

Here, the light with the divided wavelengths is input to a reflection-type wavelength divider 930. The reflection-type wavelength divider 930 divides the input light into finer wavelengths by reflecting the input light. The reflection-type wavelength divider 930 may be omitted, and a spectroscopic device 900 may be configured without the reflection-type wavelength divider 930.

Light reflected by the reflection-type wavelength divider 930 is then input to a sample inlet 950 through a lens 940. According to an example embodiment, the lens 940 may be disposed at an output end of the reflection-type wavelength divider 930 or the output end of the planar lightwave circuit 920 of the spectroscopic device 900. According to another example embodiment, the lens 940 may be omitted from the spectroscopic device 900, and the light passing through the output end of the reflection-type wavelength divider 930 may be input directly to the sample inlet 950.

Light passing through the sample inlet 950 is input to a CCD 960, and converted to an electrical signal through the CCD 960. The electrical signal is processed by a control and signal processor 970 to indicate a light intensity based on each wavelength. A signal output from the control and signal processor 970 is used, through an input and output interface 980, for various spectroscopic functions, for example, a spectrum analysis for each wavelength.

As necessary, the sample inlet 950 may be omitted from the spectroscopic device 900, or disposed before the optical fiber 910.

Figure 10:
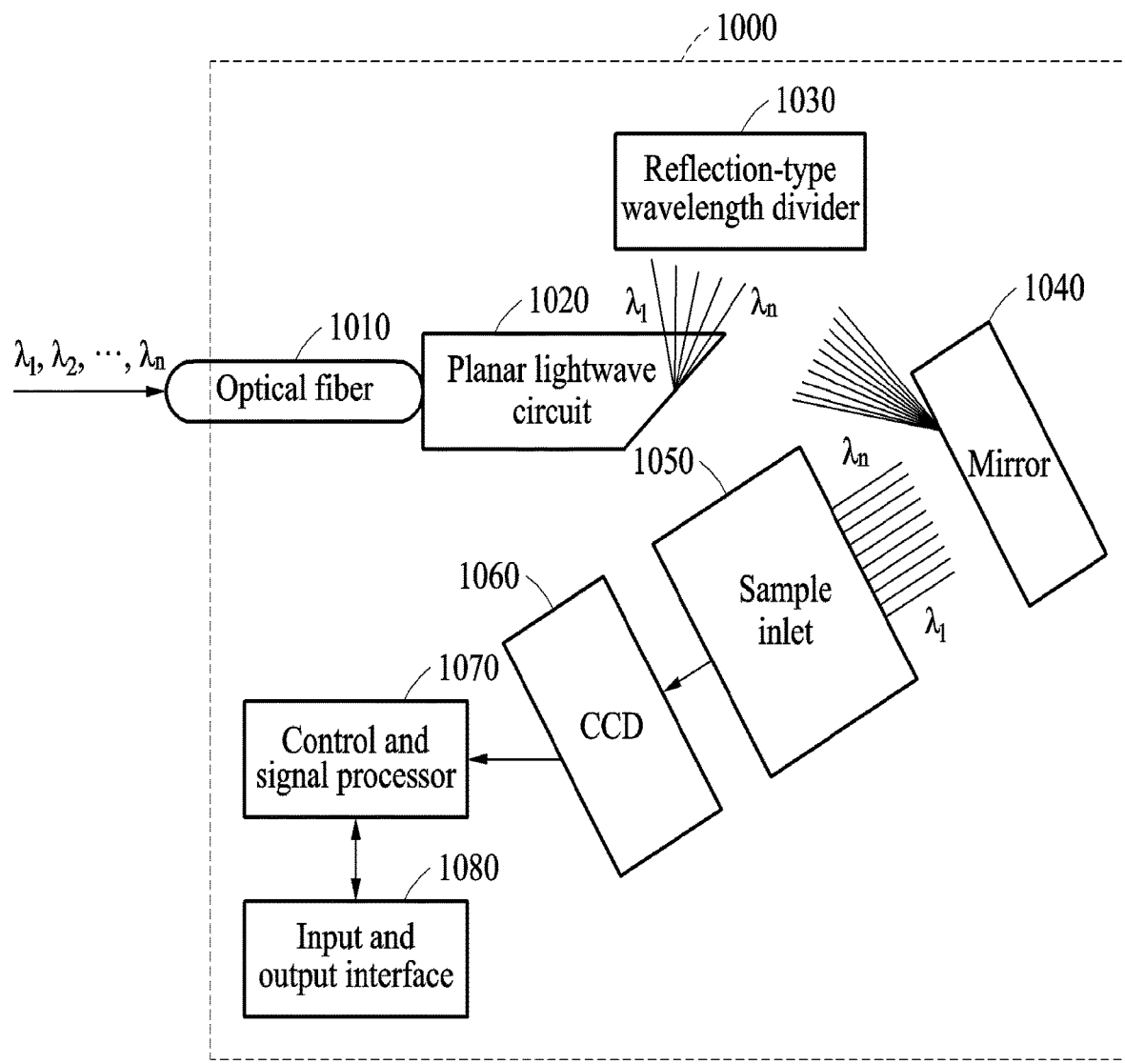
FIG. 10 is a diagram illustrating a spectroscopic device using a planar lightwave circuit configured to change a path of light, a reflection-type wavelength divider, and a mirror according to an example embodiment.

FIG. 10 is a diagram illustrating a spectroscopic device using a planar lightwave circuit configured to change a path of light, a reflection-type wavelength divider, and a mirror according to an example embodiment.

Referring to FIG. 10, light, such as white light, in which a plurality of wavelengths is combined is transferred to a planar lightwave circuit 1020 through an optical fiber 1010, for example, a thin glass and a plastic fiber. That is, an output end of the optical fiber 1010 is connected to an input end of the planar lightwave circuit 1020. The output end of the optical fiber 1010 is connected to the input end of the planar lightwave circuit 1020, which enables a function as a slit. Because a resolution may vary based on a size of a slit, the resolution may be improved by decreasing a size of an input end of the optical fiber 1010 to which the light is input.

The white light input to the planar lightwave circuit 1020 is divided into wavelengths while passing through the planar lightwave circuit 1020. Thus, an output end of the planar lightwave circuit 1020 outputs light with the divided wavelengths to different locations based on each of the divided wavelengths.

According to an example embodiment, the output end of the planar lightwave circuit 1020 may be inclined or etched at a predetermined angle to change a path of light. As illustrated, the output end of the planar lightwave circuit 1020 is etched to be inclined at a predetermined angle. Thus, a path of the light with the divided wavelengths that is output from the etched output end of the planar lightwave circuit 1020 is changed. A degree of such a change in the path is determined based on the etched angle.

Here, the light with the divided wavelengths that is output from the planar lightwave circuit 1020 is input to a reflection-type wavelength divider 1030. The reflection-type wavelength divider 1030 divides the input light into finer wavelengths by reflecting the input light. The reflection-type wavelength divider 1030 may be omitted, and a spectroscopic device 1000 may be configured without the reflection-type wavelength divider 1030.

Light reflected by the reflection-type wavelength divider 1030 is reflected by a mirror 1040 and a path of the light is changed. The light of which the patch is changed is then input to a sample inlet 1050.

The spectroscopic device 1000 may further include a lens in addition to the mirror 1040. Here, the lens may be disposed at an output end of the reflection-type wavelength divider 1030 or the output end of the planar lightwave circuit 1020 of the spectroscopic device 1000.

Light passing through the sample inlet 1050 is input to a CCD 1060, and converted to an electrical signal through the CCD 1060. The electrical signal is processed by a control and signal processor 1070 to indicate a light intensity based on each wavelength. A signal output from the control and signal processor 1070 is used, through an input and output interface 1080, for various spectroscopic functions, for example, a spectrum analysis for each wavelength.

As necessary, the sample inlet 1050 may be omitted from the spectroscopic device 1000, or disposed before the optical fiber 1010.

A planar lightwave circuit described above with reference to FIGS. 2 through 10 may include an input end as one port and an output end as one port. In such a case, the planar lightwave circuit may function as a slit that functions as a simple transmission passage of light in which a wavelength of the light is not divided. Thus, light passing through the planar lightwave circuit may be output at a same location based on wavelengths of the input light, for example, $\lambda_1, \lambda_1, \sim, \lambda_n$.

In addition, the planar lightwave circuit may divide a wavelength of incident or input light and output light with the divided wavelengths. That is, the light passing through the planar lightwave circuit may be output from an output end of the planar lightwave circuit to different locations based on each of the wavelengths $\lambda_1, \lambda_1, \sim, \lambda_n$.

Figure 11:
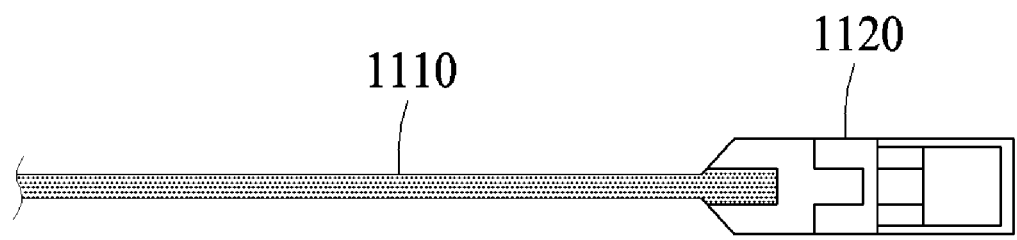
FIG. 11 is a diagram illustrating a planar lightwave circuit according to an example embodiment.

FIG. 11 is a diagram illustrating a planar lightwave circuit according to an example embodiment.

Referring to FIG. 11, a planar lightwave circuit 1120 includes an input end as one port and an output end as one port. The planar lightwave circuit 1120 is connected to an optical fiber 1110, and light passing through the optical fiber 1110 is thus input to the input end of the planar lightwave circuit 1120 and output through the output end of the planar lightwave circuit 1120.

Figure 12:
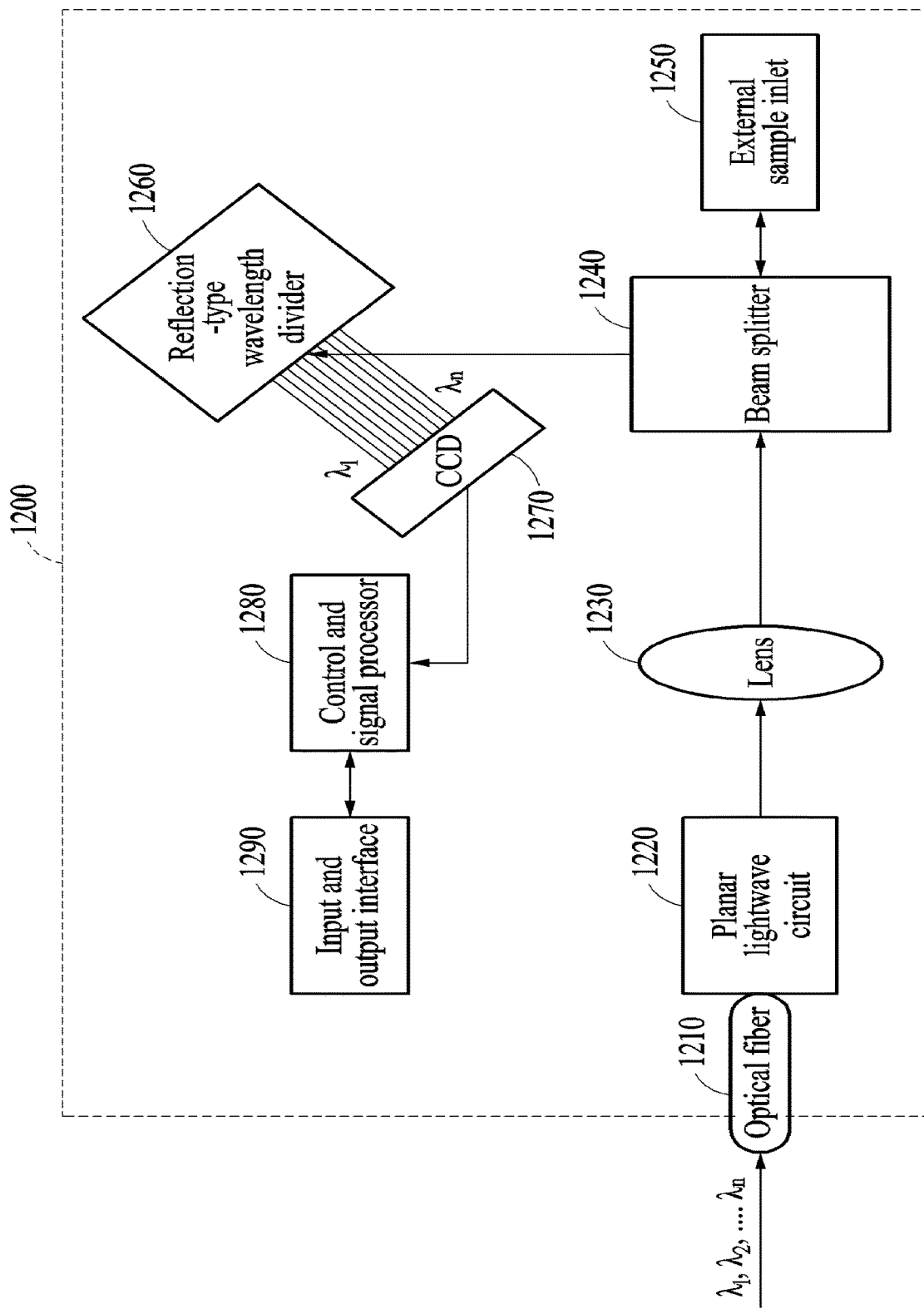
FIG. 12 is a diagram illustrating a spectroscopic device using a planar lightwave circuit, a beam splitter, and a sample inlet according to an example embodiment.

FIG. 12 is a diagram illustrating a spectroscopic device using a planar lightwave circuit, a beam splitter, and a sample inlet according to an example embodiment.

Referring to FIG. 12, light, such as white light, in which a plurality of wavelengths is combined is transferred to a planar lightwave circuit 1220 through an optical fiber 1210, for example, a thin glass and a plastic fiber. That is, an output end of the optical fiber 1210 is connected to an input end of the planar lightwave circuit 1220.

The output end of the optical fiber 1210 is connected to the input end of the planar lightwave circuit 1220, which enables a function as a slit. Because a resolution may vary based on a size of a slit, the resolution may be improved by decreasing a size of an input end of the optical fiber 1210 to which the light is input.

The white light input to the planar lightwave circuit 1220 is input to one port and then output through one port, for the function as a slit. The light output from the planar lightwave circuit 1220 is input to a beam splitter 1240 through a lens 1230. The light input to the beam splitter 1240 proceeds to a sample inlet 1250, and then is reflected by the sample inlet 1250 to proceed back to the beam splitter 1240. The light input to the beam splitter 1240 is then input to a reflection-type wavelength divider 1260.

Light reflected by the reflection-type wavelength divider 1260 is output to different locations based on wavelengths $\lambda_1, \lambda_2, \sim, \lambda_n$, and then input to a CCD 1270. The light input to the CCD 1270 is converted to an electrical signal through the CCD 1270. The electrical signal is converted to an electrical value through a control and signal processor 1280 to indicate a light intensity based on each wavelength. A signal output from the control and signal processor 1280 is used, through an input and output interface 1290, for various spectroscopic functions, for example, a spectrum analysis for each wavelength. Here, an additional lens may be further attached to an input end of the CCD 1270. The sample inlet 1250 may be disposed inside or outside a spectroscopic device 1200.

Figure 13:
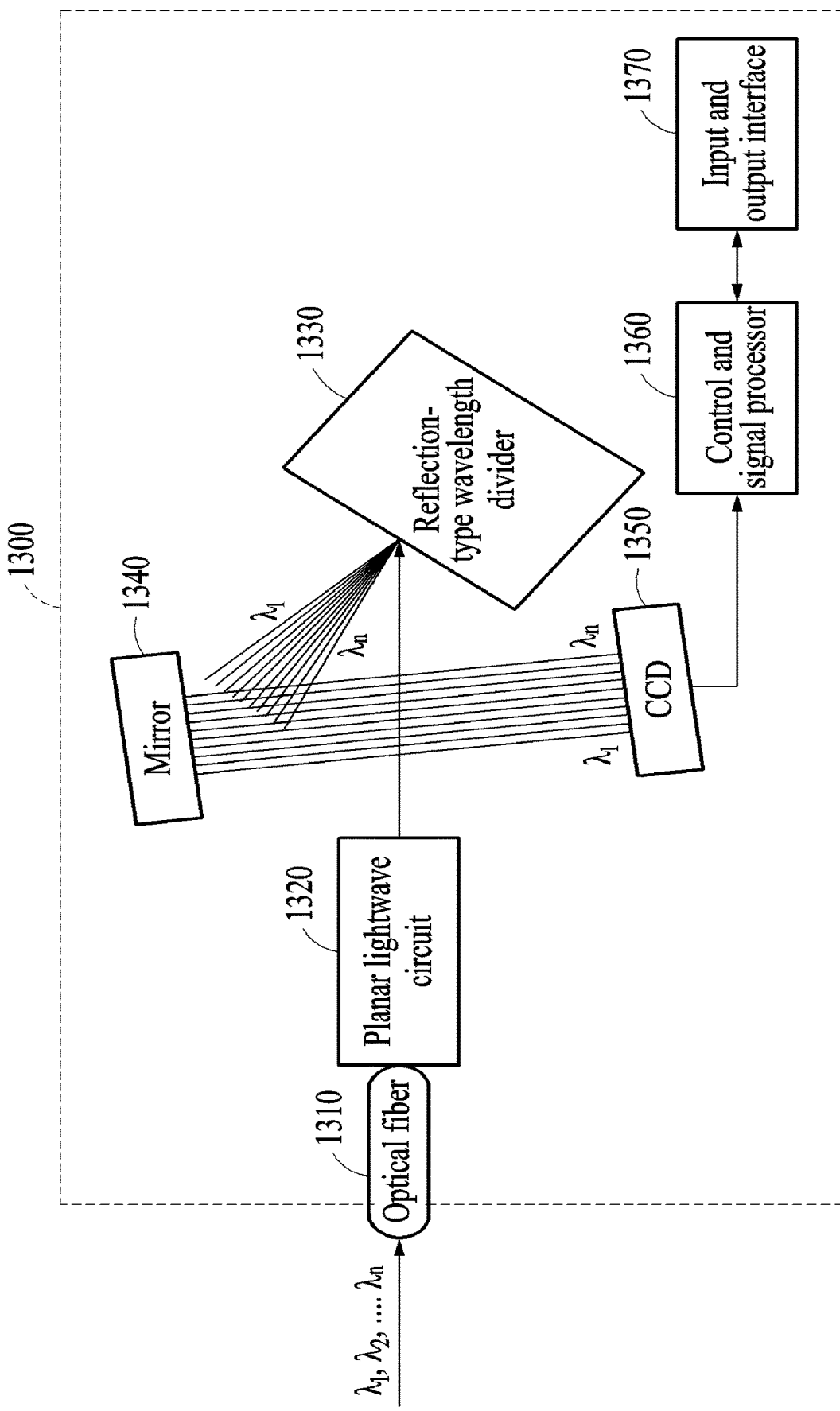
FIG. 13 is a diagram illustrating a spectroscopic device using a planar lightwave circuit, a reflection-type wavelength divider, and a mirror according to an example embodiment.

FIG. 13 is a diagram illustrating a spectroscopic device using a planar lightwave circuit, a reflection-type wavelength divider, and a mirror according to an example embodiment.

Referring to FIG. 13, light, such as white light, in which a plurality of wavelengths is combined is transferred to a planar lightwave circuit 1320 through an optical fiber 1310, for example, a thin glass and a plastic fiber. That is, an output end of the optical fiber 1310 is connected to an input end of the planar lightwave circuit 1320.

The output end of the optical fiber 1310 is connected to the input end of the planar lightwave circuit 1320, which enables a function as a slit. Because a resolution may vary based on a size of a slit, the resolution may be improved by decreasing a size of an input end of the optical fiber 1310 to which the light is input.

The white light input to the planar lightwave circuit 1320 is input to one port and then output through one port, for the function as a slit. The light output from the planar lightwave circuit 1320 is input to a reflection-type wavelength divider 1330. The light input to the reflection-type wavelength divider 1330 is reflected to be output to different locations based on wavelengths $\lambda_1, \lambda_2, \sim, \lambda_n$, and then reflected again by a mirror 1340 to be input to a CCD 1350. The light input to the CCD 1350 is converted to an electrical signal through the CCD 1350. The electrical signal is converted to an electrical value through a control and signal processor 1360 to indicate a light intensity based on each wavelength. A signal output from the control and signal processor 1360 is used, through an input and output interface 1370, for various spectroscopic functions, for example, a spectrum analysis for each wavelength. Here, a lens may be further attached to a front end of the CCD 1350, and a sample inlet may also be attached to the output end of the planar lightwave circuit 1320 or an input end of the CCD 1350 of a spectroscopic device 1300.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A spectroscopic device comprising:
    a planar lightwave circuit to which light passing through an optical fiber is input, the planar lightwave circuit configured to divide wavelengths of the light from the optical fiber;
    a reflection-type wavelength divider that more finely divides respective wavelengths of light passing from the planar lightwave circuit;
    a beam splitter configured to divide a traveling direction of light passing from the reflection-type wavelength divider into an external sample inlet and an internal sample inlet, and adjust power of the divided light;
    a charge-coupled device (CCD) image sensor configured to convert light transmitted from the internal sample inlet to an electrical signal, or convert light reflected by the external sample inlet to an electrical signal;
    a control and signal processor configured to process the electrical signal to indicate a light intensity based on each wavelength; and
    an input and output interface configured to perform a spectrum analysis for each wavelength using the processed electrical signal.

2. The spectroscopic device of claim 1, wherein the planar lightwave circuit is configured to function as a slit by inputting the light to one port and outputting the light through one port.

3. The spectroscopic device of claim 1, wherein at least one of the internal sample inlet or the external sample inlet is used based on an amount of light transmitted from or reflected by a sample.

4. The spectroscopic device of claim 1, further comprising:
    a lens configured to allow the light to pass therethrough;
    wherein the lens is disposed at an output end of the planar lightwave circuit or an output end of the reflection-type wavelength divider, or an output end of the beam splitter or an input end of the CCD image sensor.

* * * * *